Patented Oct. 24, 1922.

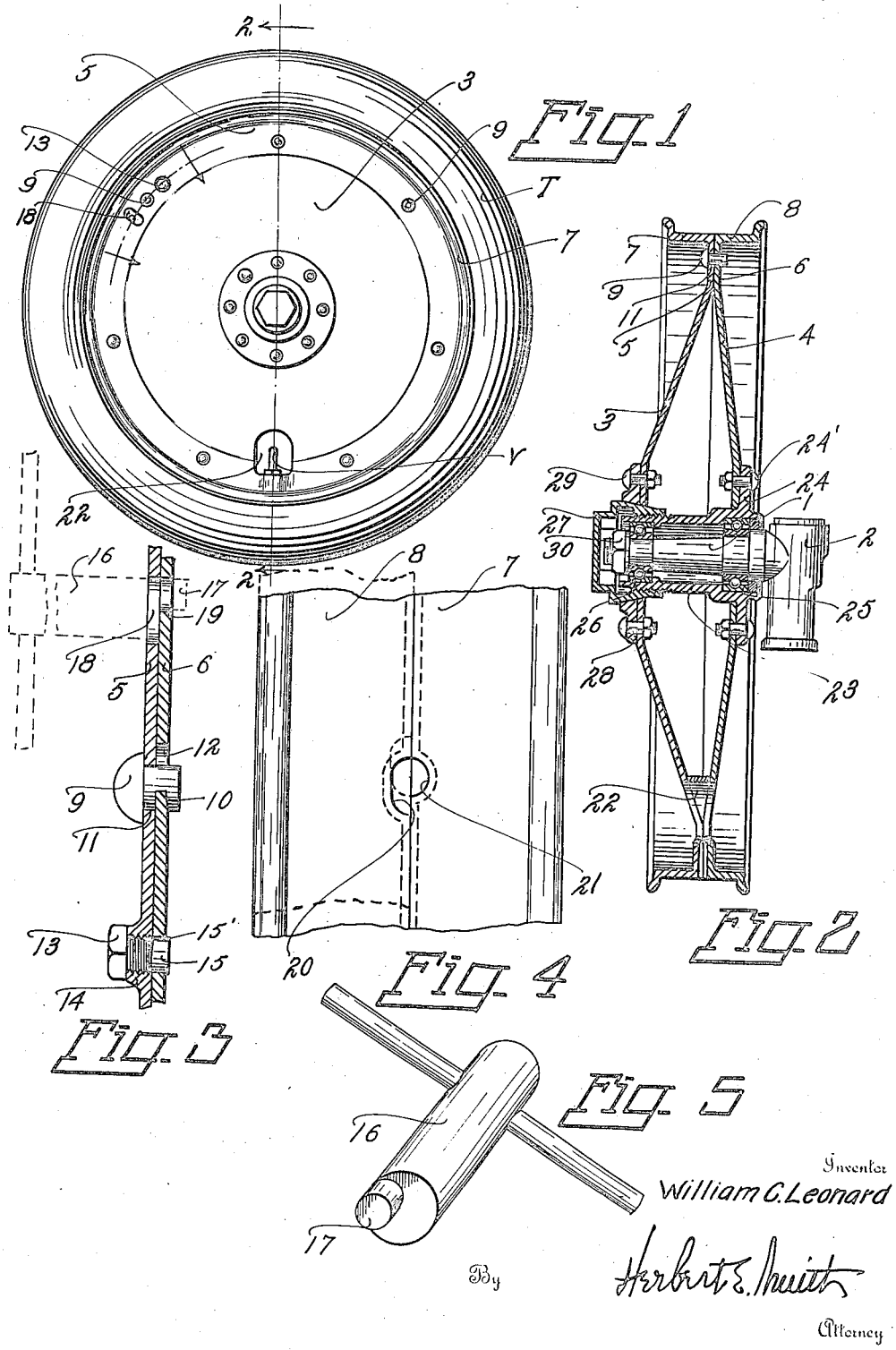

1,432,763

UNITED STATES PATENT OFFICE.

WILLIAM CLYDE LEONARD, OF LEWISTON, IDAHO, ASSIGNOR TO THE LEONARD ROLLER GEAR DRIVE THRESHER COMPANY, OF LEWISTON, IDAHO.

AUTOMOBILE WHEEL.

Application filed March 19, 1921. Serial No. 453,586.

*To all whom it may concern:*

Be it known that I, WILLIAM C. LEONARD, a citizen of the United States, residing at Lewiston, in Nez Perce County, and State of Idaho, have invented certain new and useful Improvements in Automobile Wheels, of which the following is a specification.

My present invention relates to improvements in automobile wheels of the demountable type that is circumferentially divided, and designed to receive and retain a cushion or pneumatic tire.

The primary object of the invention is the provision of a strong, durable, and well braced wheel having a circumferentially divided, sectional rim with which the disk portions of the wheel are made integral, and employing a hub construction for holding the central portion of the wheel, in conjunction with locking means near the periphery of the wheel for fastening together the wheel sections, as will be hereinafter more fully pointed out.

In the accompanying drawings I have illustrated one complete example of the physical embodiment of my invention, wherein a sheet metal construction, or metallic plates are utilized, and combined and arranged according to the best mode I have thus far devised for the practical application of the principles of my invention.

Figure 1 is a side view of a wheel embodying my invention.

Figure 2 is an enlarged view of the wheel, omitting the tire, at line 2—2 of Figure 1.

Figure 3 is an enlarged, detail sectional view showing the locking means for the sectional wheel, near the rim.

Figure 4 is a fragmentary view showing the provision in the wheel rim for the valve stem or dust cap of a pneumatic tire.

Figure 5 is a detail perspective view of the tool for circumferentially sliding one section of the wheel with relation to the other section for engaging the locking means near the periphery.

In order that a clear understanding of my invention may be secured I have illustrated the journal 1 and a portion of the spindle socket 2 of an automobile axle, upon which the wheel of my invention is secured in Figure 2.

The essential parts of the wheel are made up of pressed metal plates, and involve a pair of disks 3 and 4, termed the outer and inner disks respectively which are fashioned in usual manner with their walls dished or converging from the hub or central portion toward the periphery, and at 5 and 6 respectively these disks are fashioned as flat rings from which the flanges 7 and 8 project at right angles to form the rim of the wheel.

The disks and wheel sections thus form a circumferentially divided wheel, which is rigidly held together near the rim by an annular series of locking pins or studs 9 located at intervals about the flat ring portions 5 and 6 of the respective sections. These pins are passed transversely through the contacting flat rings and each pin is fashioned with a peripheral notch 10, passed through a circular opening 11 in the ring 5 and extends through an elongated opening or slot 12 in the plate or ring 6 as shown in Figure 3. These openings and slots are spaced around the disks, in registering pairs, and the notched pins engage the edge of the wall of the elongated opening or slot 12, to lock the parts together. A securing bolt 13 is threaded into a boss 14 on the ring 5, and its smooth end 15 projects into a circular opening 15' in the ring 6. The two disks are adapted to be locked together by means of a hand tool 16 having an eccentric 17, the former adapted to enter a large slotted opening 18 in the plate 5 and the latter to enter an opening 19, of smaller diameter and offset from the large opening, in the plate 6 as shown. Thus when the two disks are applied together, and the several notched pins 9 passed through the registering openings 11 and 12 with their notches in proper position, the tool 16 is inserted into the two registering openings 18 and 19 as indicated in dotted lines Figure 3. Now with the disk 3 as a support, the tool 16 is turned causing the eccentric head 17 of the tool to turn the disk 4, circumferentially. This action causes the edge walls of the slots 12 to enter the complementary notches in the locking pins, and the disks are clamped together at the several points about the wheel against lateral movement. After turning the disk into locking position the returning bolt 13 is turned home to seat its rounded smooth end 15 in the opening 15' which has previously been brought into position to register with the bolt 13. The bolt 13 now holds the disks against relative movement circumferentially of the wheel, and the co-action of the pins with the slotted disk prevents lateral movement of the disks, thus insuring a rigid, well braced structure for the support of the tire indicated at T in Figure 1.

To provide for the valve stem or dust cap V shown in Figure 1 the relatively movable disk in its flat ring 6 is provided with an elongated recess 20, and the stationary disk has a semi-circular recess 21 in its ring 5 extending radially of the wheel. These two recesses as shown are adapted to register and form a radially extending opening to accommodate the dust cap or valve stem, and a transverse opening 22 is provided in the disks, as seen in Figures 1 and 2, to give access to the valve, the walls of this opening being closed to prevent ingress of dust or dirt to the interior of the disk wheel.

The hub 23 at the center of the wheel is a tubular metallic member having an inner circular flange 24 that is secured by rivets 24' to the disk 4 which has an open center through which the hub is passed, and antifriction bearings 25, 26 are interposed between the journal 1 and hub in usual manner. The bearing is closed and protected by the use of a threaded and externally tapered nut-cap 27 that is screwed on the complementary threads on the hub member, and this cap passes through an open circular hub plate or ring 28 that is riveted at 29 as a reinforcement to the disk 3 of the wheel. The exterior of the nut-cap is tapered, and the opening through the hub plate 28 and disk is also tapered complementary thereto in order to form a wedge action within the disk when the hub cap is screwed home as in Figure 2.

In assembling the wheel, the tire is first placed in position on the rim section 8, and the rim section 7 is then placed in position against the free side of the tire with the flat rings 5 and 6 in close contact, the pins 9 are then inserted in position, the tool 16 applied, and then by turning the tool the sectional members of the wheel are brought together, and the bolt 13 screwed home to lock the members in secured position. The hub cap-nut is now applied to the hub and threaded thereon, the wedge action of the tapered cap forcing the disk 3 inwardly and rendering the hub, disks and rims a rigid, well braced structure for supporting the load on the tire.

The wheel may be bodily withdrawn from its journal by withdrawing the hub nut-cap, and removing the nut 30 on the reduced end of the journal, after which the wheel may be slipped off the journal as usual. For the demounting of a tire while the wheel remains on its journal, the nut-cap only is removed, then, after removing the lock stud or bolt 13, the tool 16 is applied to turn the disk 4 in order to free the ring 6 from the notched pins. After the disk is turned and freed from the locking pins, the outer disk may be withdrawn, permitting removal of the tire from the inner wheel section.

From the above description taken in connection with my drawings it is apparent that I have provided a strong, durable and well braced wheel which may be assembled or dismounted with facility, in which the two circumferentially divided sections are rigidly and firmly held together when in operative position, and which may be constructed at a comparatively low cost of production.

Having thus fully described my invention, what I claim as new and desire to secure by Letters Patent is—

The combination in a sectional, circumferentially divided wheel comprising a pair of disks each having a flattened peripheral ring, of pins formed with transverse notches passed through one ring and adapted to coact with the walls of complementary slots in the other ring, one of said rings having an opening to receive a tool and the other ring having a complementary offset opening to receive an eccentric head on the tool for turning said rings, and a locking bolt securing said rings together against circumferential movement.

In testimony whereof I affix my signature.

WILLIAM CLYDE LEONARD.